United States Patent [19]
Suzuki et al.

[11] Patent Number: 5,926,650
[45] Date of Patent: Jul. 20, 1999

[54] METHOD AND SYSTEM UTILIZING A NEGOTIATION PHASE TO TRANSFER COMMANDS AND DATA IN SEPARATE MODES OVER A HOST/PERIPHERAL INTERFACE

[75] Inventors: Noriyuki Suzuki, Tokyo; Tomokazu Mikawa, Yokohama, both of Japan

[73] Assignee: Canon Kabushiki Kaisha, Tokyo, Japan

[21] Appl. No.: 08/661,565

[22] Filed: Jun. 11, 1996

[30] Foreign Application Priority Data

Jun. 15, 1995 [JP] Japan .................................. 7-148794

[51] Int. Cl.⁶ .................................................. G06F 13/42
[52] U.S. Cl. .................. 395/834; 395/823; 395/824; 395/825; 395/828; 395/834; 395/840
[58] Field of Search ..................... 395/821, 823, 395/824, 825, 828, 834, 840, 280

[56] References Cited

U.S. PATENT DOCUMENTS

| | | | |
|---|---|---|---|
| 5,327,539 | 7/1994 | Sudo et al. | 395/325 |
| 5,561,821 | 10/1996 | Gephardt et al. | 395/848 |
| 5,581,669 | 12/1996 | Voth | 395/113 |
| 5,634,081 | 5/1997 | Krakirian | 395/894 |
| 5,710,939 | 1/1998 | Ballachino et al. | 395/821 |

FOREIGN PATENT DOCUMENTS

| | | |
|---|---|---|
| 58-117036 | 7/1983 | Japan . |
| 055150914 | 6/1993 | Japan . |

OTHER PUBLICATIONS

IEEE 1284 Standard as disclosed by Warp Nine Engineering, High–Speed, Enhanced Peripheral Connectivity Solutions, Internet—http://www.fapo.com/, Dec. 1994.

*Primary Examiner*—Thomas C. Lee
*Assistant Examiner*—Douglas Rupert
*Attorney, Agent, or Firm*—Fitzpatrick, Cella, Harper & Scinto

[57] ABSTRACT

A command information transfer method and system capable of transferring command information by discriminating it from data information, and capable of using protocols of IEEE P1284, when a nibble or byte mode is incorporated which is stipulated by IEEE P1284 as bi-directional parallel I/F. A new communication mode simulating the extensibility link is set by an extensibility request value undefined by IEEE P1284 and command information is transferred at the second and following bytes of such multiple-byte negotiation. An nFault signal is used for both a notice of error and for a reverse direction information transfer request.

30 Claims, 8 Drawing Sheets

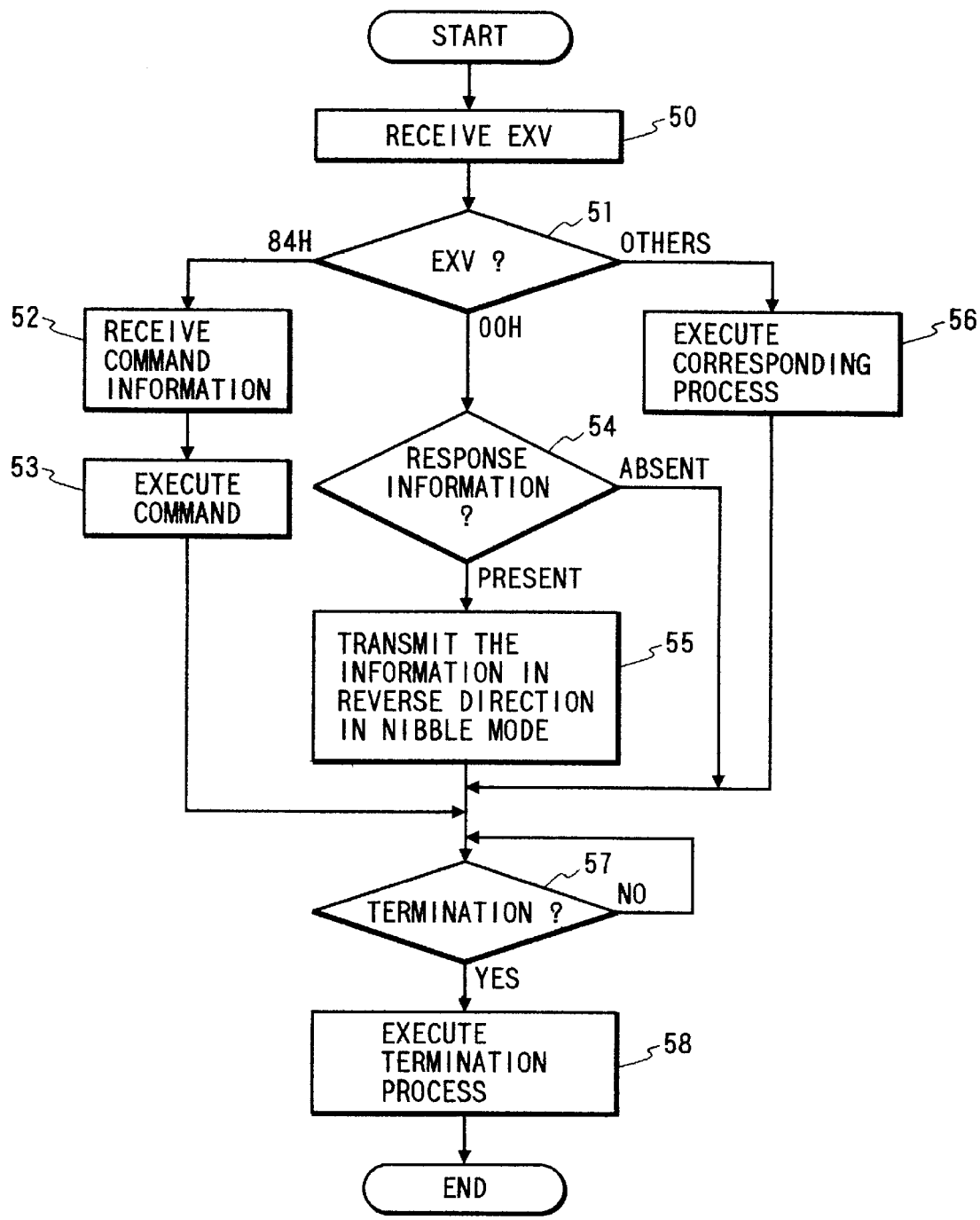

METHOD AND SYSTEM UTILIZING A NEGOTIATION PHASE TO TRANSFER COMMANDS AND DATA IN SEPARATE MODES OVER A HOST/PERIPHERAL INTERFACE

BACKGROUND OF THE INVENTION

1. Field of the Invention

The present invention relates to an information transfer method and system for transferring data between hosts such as personal computers and peripherals such as printers.

2. Related Background Art

It is well known that parallel I/F of Centronics Inc. (hereinafter called Centronics I/F) is widely used for parallel data transfer between hosts such as personal computers and peripherals such as printers.

Examples of the structure of a printer using Centronics I/F are disclosed in Japanese Patent Application Laid-open Nos. 58-117036 and 5-150914. With reference to FIG. 10, data transfer of conventional techniques will be described. In FIG. 10, reference numeral 1 represents a CPU, reference numeral 2 represents a ROM for storing CPU control programs, font data, and the like, reference numeral 3 represents a RAM, reference numeral 4 represents a Centronics I/F unit, reference numeral 5 represents a DMA controller, and reference numeral 6 represents a printer unit such as an ink jet printer. Working areas for a reception buffer and a print buffer are reserved in RAM 3. When information is supplied from an external host to the Centronics I/F unit 4, this I/F unit 4 interrupts CPU 1. During this interrupt process, CPU 1 reads the information from the Centronics I/F unit 4 and temporarily stores it in the reception buffer.

Next, CPU 1 fetches the information from the reception buffer, and if the information is command information, it executes the process corresponding to the command information, whereas if the information is print data such as image data and character code data, it executes a process such as font development and transfers the results to the print buffer. When necessary data is collected and loaded in the print buffer, the DMA controller 5 DMA transfers the data in the print buffer to the printer unit 6 which prints the data. Although a method has been proposed in which transmission information is directly DMA transferred to the reception buffer without the interrupt process, temporary storage of transmission information in the reception buffer is the same as the conventional method.

Centronics I/F does not stipulate a method of transferring data by discriminating between command information and print data information. Therefore, as described above, data read from the reception buffer is judged whether it is command information or print data information and thereafter a proper process is performed.

Some conventional apparatus with Centronics I/F use an nAutoFd signal as a control bit for discriminating between command information and data information, without using this signal for its original purpose (refer to IEEE P1284 D2.00 September, 1993).

Extending Centronics I/F for uni-directional information transfer to bi-directional information transfer has been stipulated by IEEE as new parallel I/F Standard (IEEE P1284 Standard Signaling Method for a Bi-direction Parallel Peripheral Interface for Personal Computers).

Several communication modes are stipulated in IEEE P1284. Of these, an ECP mode stipulates a method of transferring data by discriminating between command information and data information in accordance with a signal on a signal line which discriminates between command information and data information. However, in a nibble mode or a byte mode using a compatibility mode similar to conventional Centronics I/F for information transfer in an ordinary direction, the signal line for discriminating between command information and data information is not provided so that command information and data information cannot be discriminated.

The ECP mode further stipulates a method of issuing an information transfer request from a peripheral to a host by using an nPeriphRequest signal. However, in the nibble mode or byte mode using a compatibility mode similar to conventional Centronics I/F for information transfer in an ordinary direction, a method of issuing an information transfer request from a peripheral in the reverse direction is not specifically stipulated.

With the above-described conventional techniques, command information and data information are sent without discriminating therebetween, and they are discriminated for the first time when they are read from the reception buffer. It is therefore difficult to transfer command information which requires an immediate process execution. Furthermore, if some abnormal state occurs at the apparatus so that data information cannot be processed (e.g., if recording sheets, ink, or the like of the printer runs out) and the apparatus stops with the reception buffer being in a full-state, command information itself cannot be transferred thereafter.

If the nAutoFd signal is used as a control bit for discriminating between command information and data information, the above disadvantage can be eliminated. However, this nAutoFd signal plays an important roll as a trigger signal on negotiation in IEEE P1284. This command information transfer method cannot be used together with protocols of IEEE P1284 which realizes bi-directional information transfer.

As described above, in the nibble mode or byte mode using a compatibility mode similar to conventional Centronics I/F for information transfer in the normal direction, a method of issuing an information transfer request from a peripheral in the reverse direction is not specifically stipulated. Accordingly, even if an abnormal state occurs at a peripheral (e.g., if recording sheets, ink, or the like of the printer runs out) and this is to be immediately notified to the host, it is not possible to request a reverse direction information transfer from the host, and this notice stands by until the communication mode transitions to the nibble or byte mode.

SUMMARY OF THE INVENTION

It is a first object of the present invention to eliminate the above-described disadvantages of conventional techniques and provide a command information transfer method and system capable of transferring command information by discriminating it from data information, and capable of using protocols of IEEE P1284, when a nibble or byte mode is incorporated which is stipulated by IEEE P1284 as bi-directional parallel I/F.

It is a second object of the present invention to provide an information transfer system capable of issuing a reverse direction information transfer request from a peripheral to a host when a nibble or byte mode is incorporated which is stipulated by IEEE P1284 as bi-directional parallel I/F.

According to an information transfer method of this invention which uses parallel I/F means having a data signal line of a plurality of bits and a plurality of control signal lines, the method comprises the steps of: transitioning to a negotiation phase in response to a specific control signal; outputting communication mode designating information for designating a communication mode when the communication mode is transitioned to the negotiation phase; and outputting command information by changing the communication mode designating information to predetermined information.

According to an information transfer system of this invention in which a host and a peripheral are connected by parallel I/F, the host comprises: means for executing a negotiation operation by using a predetermined extensibility request value for transfer of command information; means for outputting the command information and the predetermined extensibility value; and means for executing a termination operation after the command information is output, and the peripheral comprises: means for judging whether the predetermined extensibility request value is input or not; means for receiving the command information transferred from the host if the judging means judges that the predetermined extensibility request value is input; and means for executing a termination response process in response to the termination operation by the host.

According to a first information transfer system of this invention in which a host and a peripheral are connected by parallel I/F, the peripheral comprises: means for changing a control signal of the parallel I/F from the peripheral to the host in a compatibility mode of the parallel I/F if there is transmission information to be transferred from the peripheral to the host; and means for transferring the transmission information in a nibble mode or in a byte mode, and the host comprises: means for detecting a state of the control signal in the compatibility mode; and means for transitioning the communication mode of the parallel I/F from the compatibility mode to another mode in accordance with the detection result.

With the above-described structure, command information and data information can be transferred discriminately from a host to a peripheral by using hardware used conventionally.

It is also possible to issue a reverse direction information transfer request from a peripheral to a host.

The other objects and features of the present invention will become apparent from the following detailed description when read in conjunction with the accompanying drawings.

BRIEF DESCRIPTION OF THE DRAWINGS

FIG. 7 is a flowchart illustrating an operation of the information transfer system.

DETAILED DESCRIPTION OF THE PREFERRED EMBODIMENTS

First Embodiment

Figure 1:
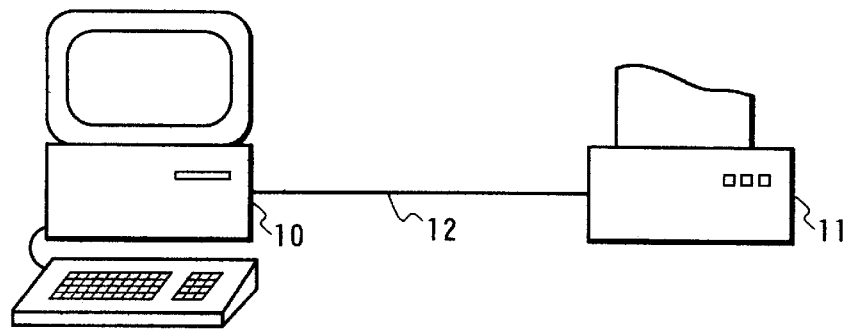
FIG. 1 is a schematic diagram showing an outline of an information transfer system embodying the present invention.

Embodiments of the invention will be described in the following. FIG. 1 is a schematic diagram showing the outline of an information transfer system embodying the present invention. In FIG. 1, reference numeral 10 represents a personal computer generally called PC compatible machines. Reference numeral 11 represents a printer. The personal computer 10 and printer 11 are connected by parallel I/F 12 in conformity with IEEE P1284 and can establish a reverse direction information transfer by using a nibble mode. The personal computer 10 transfers command information to the printer 11 in the manner to be described later. The printer 11 executes a process corresponding to the transferred command information, and if necessary, sends response information back to the personal computer 10. Therefore, the personal computer 10 can execute a remote control of the printer 11 and can monitor the operation state or the like of the printer 11 so that a user friendlier print system comfortable to use can be realized.

Of the communication modes defined by IEEE P1284, the nibble mode realizes information transfer from a peripheral to a host by using four control signals. Since data signals are not required to be compatible with bi-directional transfer, hardware like conventional Centronics I/F can be used and a PC compatible machine such as personal computer 10 can perform bi-directional communication by using proper software.

Figure 2:
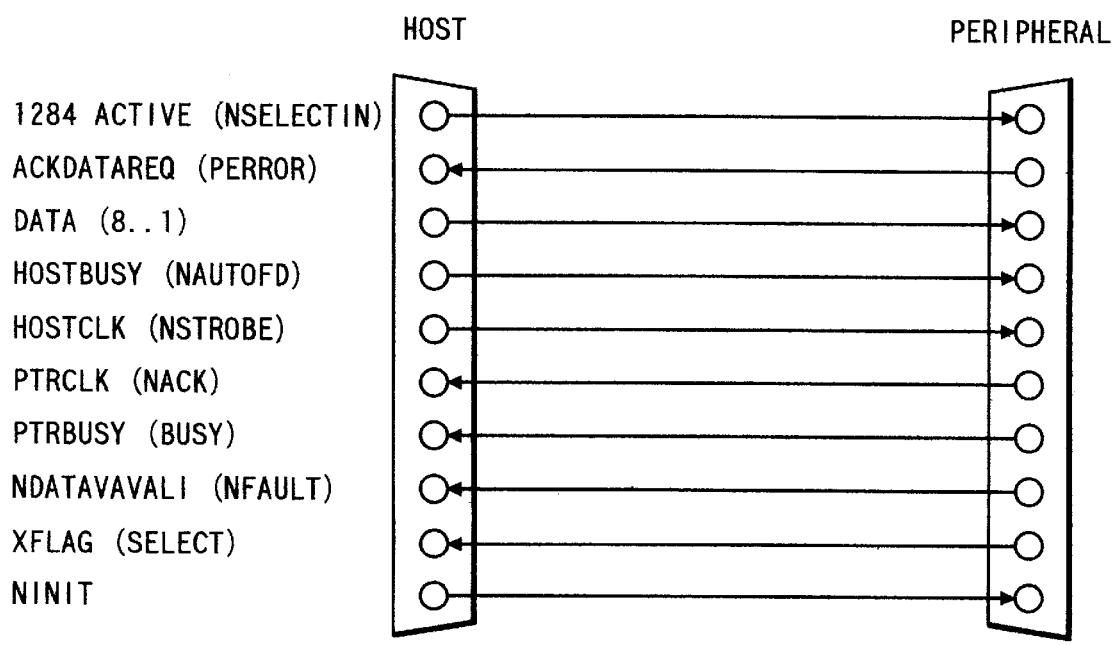
FIG. 2 is a diagram illustrating connection signals of a parallel I/F unit.

The details of connection signals of the parallel I/F 12 are shown in FIG. 2. For the meanings of each signal, refer to the description given in IEEE P1284. Signal names given in FIG. 2 are used for the nibble mode, and the names for the compatibility mode are given in parentheses. An arrow of each signal indicates the direction of signal transfer.

Figure 3:
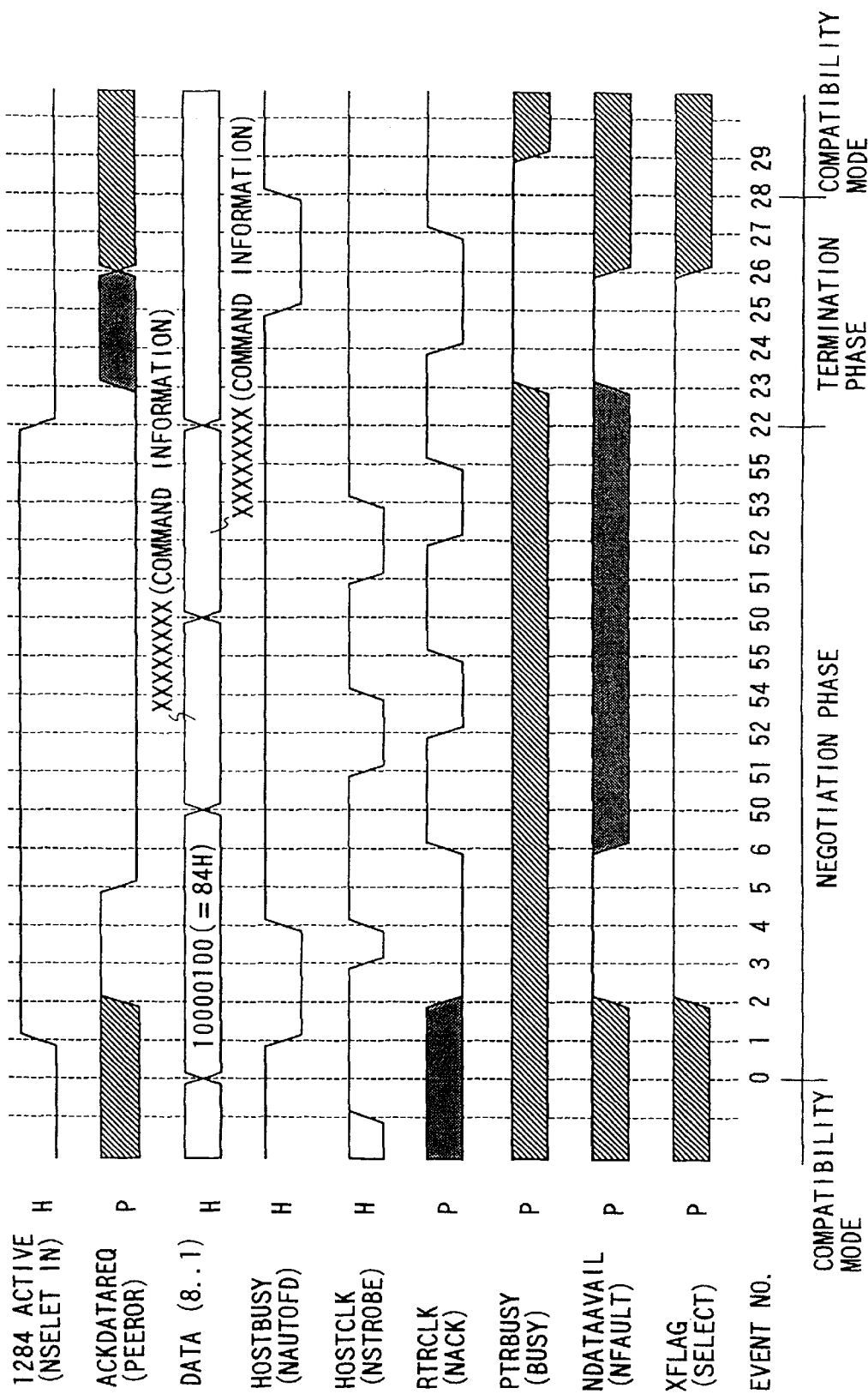
FIG. 3 is a timing chart of the connection signals.

FIG. 3 is a timing chart of each signal of the parallel I/F 12 wherein command information is transferred from the personal computer 10 to the printer 11 by the method of this invention. As seen from this timing chart of FIG. 3, timings are analogous to the timings of an extensibility link negotiation stipulated by IEEE P1284. Different points are that an extensibility request value is changed from 80H to 84H undefined by IEEE P1284, that information of the second and following bytes is not communication mode designating information but command information, and that the way how an XFlag signal performs acknowledge response. Specifically, in this invention, a new communication mode (for convenience, hereinafter called "command transfer mode") simulating the extensibility link is set by the extensibility request value (84H) undefined by IEEE P1284 and command information is transferred at the second and following bytes of such multiple-byte negotiation. Since the information at the second and following bytes does not indicate a communication mode, the XFlag signal may be set to an acknowledge response during the negotiation. Although in FIG. 3 transfer of two-byte command information is illustrated, the number of bytes may be obviously extended to a desired number of necessary bytes. In FIG. 3, a shaded portion indicates a don't-care period, and a hatched portion indicates the compatibility mode. The event numbers at the lowest row has generally the same numbers as the extensibility link.

Figures 4, 6:
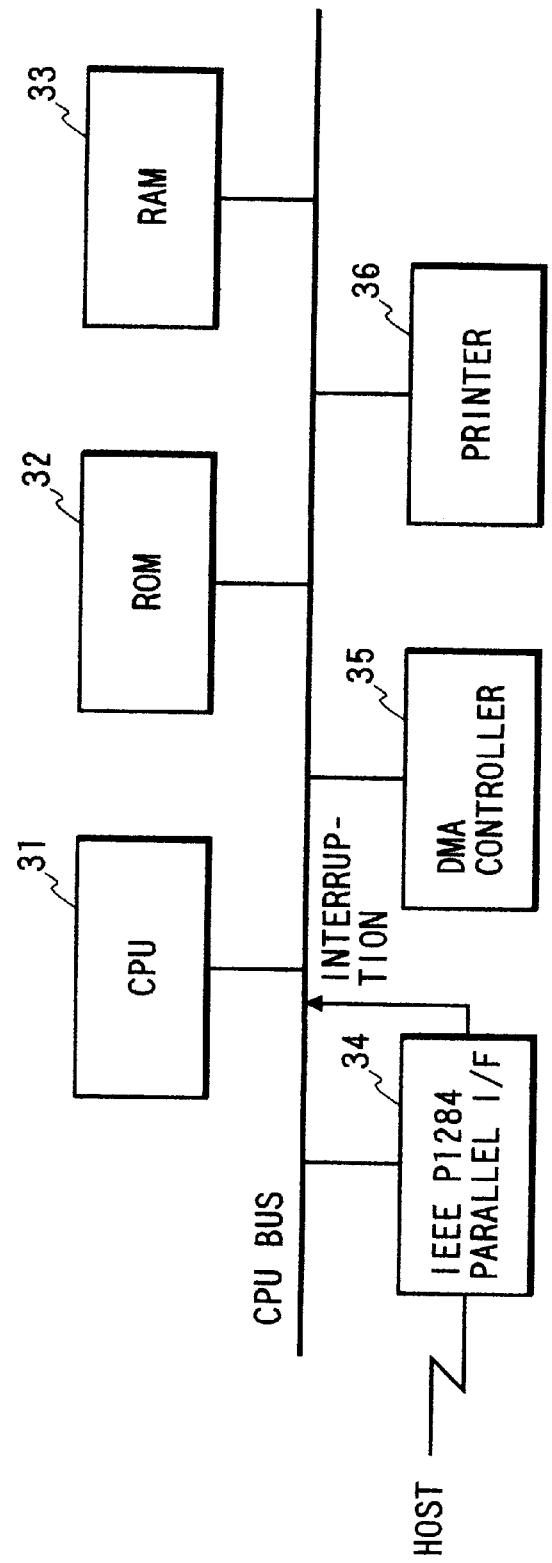
FIG. 4 is a diagram showing the format of command information.
FIG. 6 is a block diagram of a printer.

The format of the command information is constituted, as shown in FIG. 4, by length information (two bytes) of the whole block as the header, a code representative of type of command information, and if necessary, parameters of the command information. The amount of information to be transferred for the negotiation by one command transfer mode is one block. However, a plurality of command information sets may be transferred by one block by using necessary numbers of type codes and parameters. The command information includes, for example, switching between on-line and off-line of the printer 11, reference to operation states, prepared functions, and the like, presence/absence of errors and their contents, and releasing errors. Of these, the reference to operation states, prepared functions, and the like, and the presence/absence of errors and their contents contain response information from the printer 11. This response information is transferred from the printer 11 to the personal computer 10 when the communication mode transitions to the nibble mode. The format of the response information is similar to that of the command information, and for the command information having a predetermined type code, the response information with the same type code is sent back (however, parameters are not necessarily the same).

Figure 5:
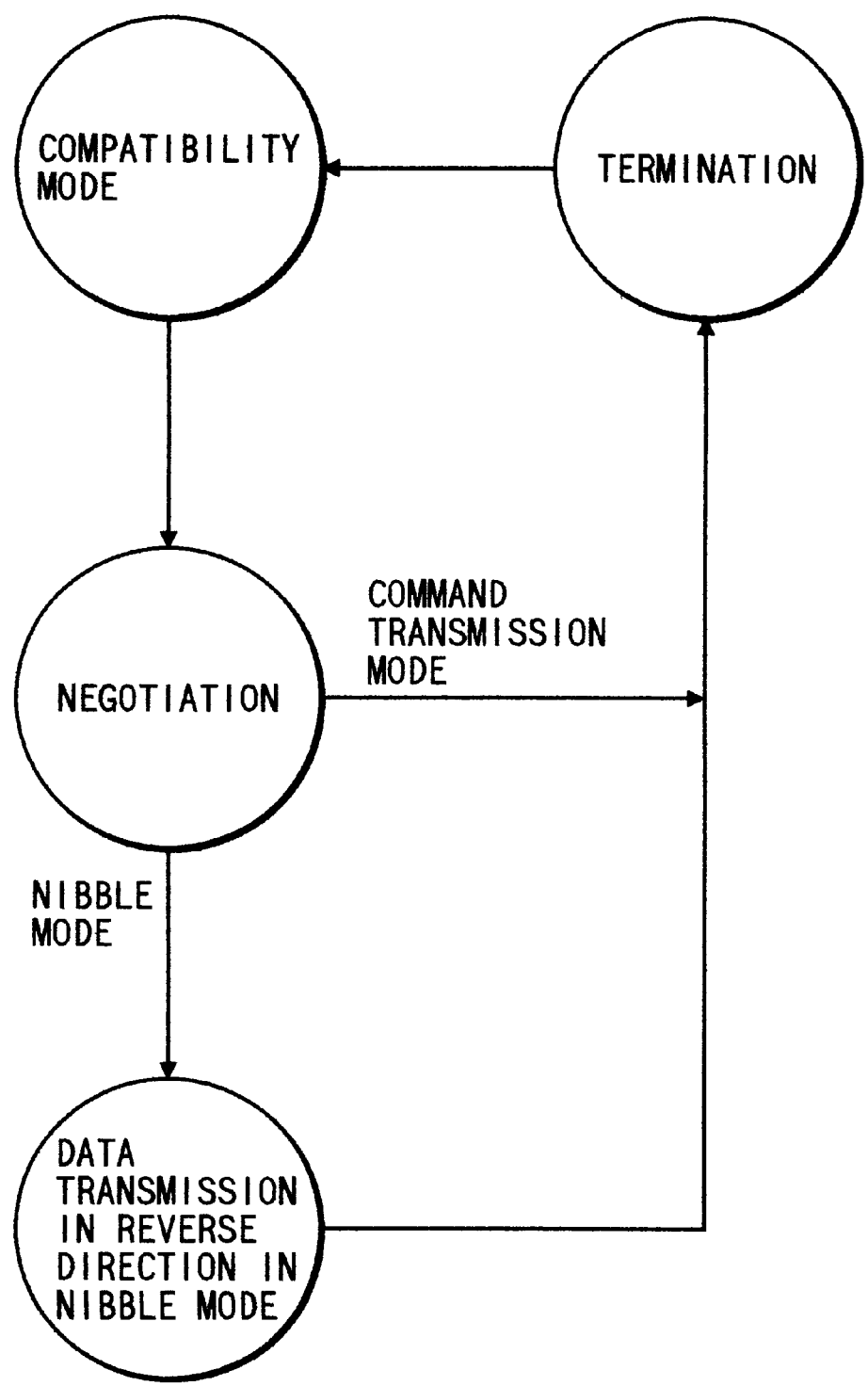
FIG. 5 is a transition diagram of communication modes.

FIG. 5 is a transition diagram of communication modes. The parallel I/F 12 first takes the compatibility mode and transfers print information from the personal computer 10 to the printer 11. When the personal computer 10 transfers command information to the printer 11, negotiation is performed in the command transfer mode. The command transfer mode has no data transfer phase because the command information is transferred during the negotiation. After completion of transferring the command information, the compatibility mode is recovered after the termination phase. In transferring the response information of command information from the printer 11 to the personal computer 10, the negotiation is performed in the nibble mode and a reverse direction information transfer is performed at the data transfer phase of the nibble mode. After completion of the reverse direction information transfer, the compatibility mode is recovered after the termination phase.

Figure 10:
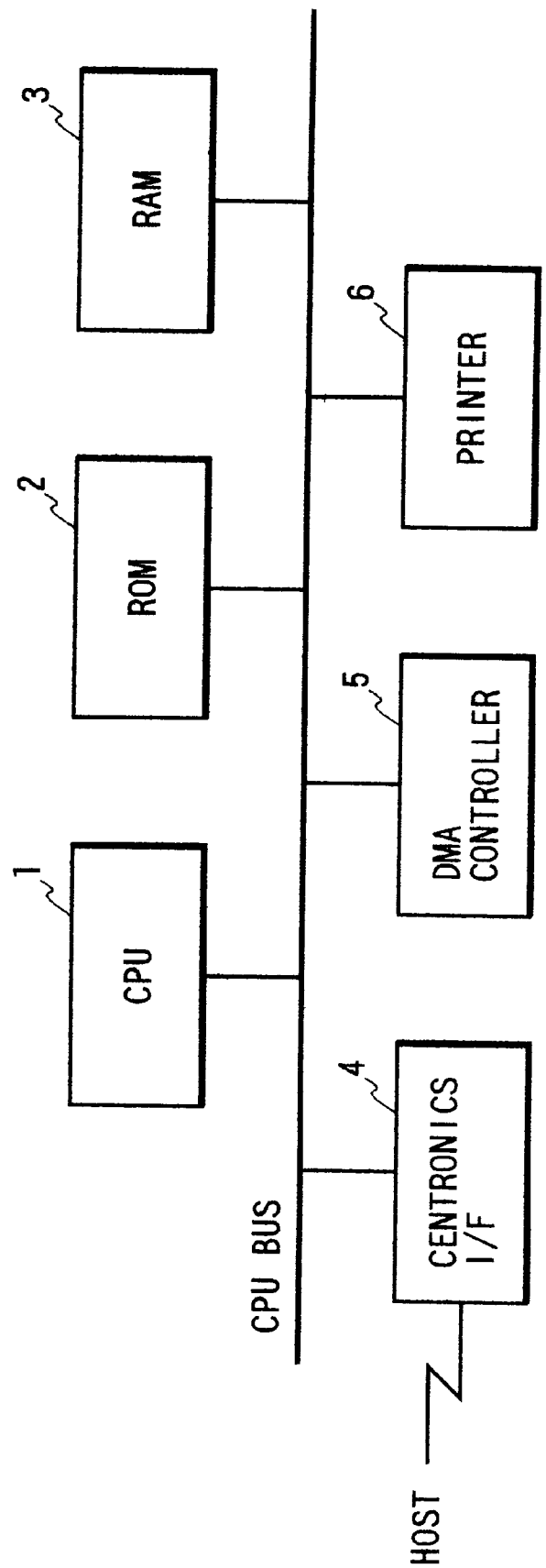
FIG. 10 is a block diagram of a conventional printer.

FIG. 6 is a block diagram of the printer 11 according to the embodiment. In FIG. 6, reference numerals 31, 33, 35, and 36 represent a CPU, a ROM, a RAM, a DMA controller, and a printer unit which are similar to those described with FIG. 10. Reference numeral 34 represents a parallel I/F circuit in conformity with IEEE P1284 in which the nibble mode supports the reverse direction information transfer as described earlier. The parallel I/F circuit 34 issues an interrupt request signal when necessary to interrupt the operation of CPU 31. In the compatibility mode, the parallel I/F circuit 34 semi-automatically controls the control signal from the printer 11 to the personal computer 10 (or CPU 31 may control it in a software manner), and in other modes it asserts or negates in accordance with an instruction from CPU 31. Namely, the procedure of protocol sequence between negotiation and termination is executed by CPU 31 in a software manner.

When print data information is transferred in the compatibility mode from the personal computer 10 to the parallel I/F circuit 34 (i.e., when the nStrobe signal is output), the parallel I/F circuit 34 sends a DMA transfer request signal to the DMA controller 35 to request for DMA transfer, and the print data information is DMA transferred to a reception buffer reserved in RAM 33. CPU 31 reads the information from the reception buffer, and after font development or the like is performed, transfers the results to a print buffer. When necessary data is collected and loaded in the print buffer, the DMA controller 35 DMA transfers the data in the print buffer to the printer unit 36 which prints the data.

When the personal computer 10 starts negotiation in any one of communication modes, the parallel I/F circuit 34 responds to it and interrupts CPU 31. In response to an interrupt, CPU 31 starts the protocol sequence of the negotiation. As CPU 31 starts the protocol sequence, the personal computer 10 transfers an extensibility request value (EXV) which is latched by a latch circuit of the parallel I/F circuit 34 synchronously with the falling edge of the HostClk signal (nStrobe signal). The DMA transfer request signal supplied to the DMA controller 35 is subjected to an AND operation with an 1284 Active signal (nSelectIn signal), and when the 1284 Active signal (nselectln signal) is Hi (high), the DMA transfer request is not output. As a result, information transferred from the personal computer 10 during the negotiation is not DMA transferred to the reception buffer reserved in RAM 33. CPU 31 reads the latched extensibility value (EXV) and proceeds the corresponding protocol sequence at timings shown in FIG. 3 in the command transfer mode or at timings stipulated by IEEE P1284 in the nibble mode.

In the command transfer mode, the command information at the second and following bytes in the multiple negotiation is also latched by the latch circuit synchronously with the falling edge of the HostClk signal (also in this case, DMA transfer to the reception buffer reserved in RAM 33 does not occur). Reading the contents of the latch circuit is repeated necessary times to obtain the command information. As described with FIG. 4, the length information at the header is transferred before the command information so that how many bytes are to be latched can be known in advance. In the printer 11 of this embodiment, print data information to be transferred in the compatibility mode, the extensibility request value (EXV) and command information to be transferred during negotiation, can be discriminately received.

FIG. 7 is a flowchart illustrating the operation of the printer 11 from negotiation to termination. After the personal computer 10 starts negotiation, an interrupt request signal is issued to obtain the extensibility request value (EXV) at Step 50 and the value is checked at Step 51. If the extensibility request value (EXV) is 84H (command transfer mode), the flow advances to Step 52 whereat the command information transferred at the second and following bytes in the multiple-byte negotiation is received and stored in RAM 33 at an area different from the reception buffer. A process corresponding to the command information received at Step 53 is executed, and the flow advances to Step 57. In this case, if the command information requires response information, this response information is stored in RAM 33. If the extensibility request value (EXV) at Step 51 is 00H (nibble mode), the flow advances to Step 54 whereat it is judged whether response information is present. Presence of the response information can be judged from whether any response information is being stored in RAM 33. If present, the response information is transferred at Step 55 in the reverse direction in the nibble mode. If there is no response information at Step 54, the flow advances to Step 57. If the extensibility request value (EXV) at Step 51 is other than 84H and 00H, e.g., if it indicates a communication mode not supported or it requests for an ID, then a process corresponding to the extensibility request value (EXV) is executed at Step 56. Next, at Step 57, the flow awaits a termination operation by the personal computer 10 and the termination process is executed at Step 58.

As described so far, in the information transfer system of this embodiment, it is possible to discriminately transfer print data information and command information. Accordingly, even if the reception buffer is full, the command information can be transferred as opposed to the conventional technique. It is also possible to execute a process immediately after a peripheral receives the command information. Therefore, command information which requires an instant process execution can be transferred without any practical problem.

Another Embodiment

In the above embodiment, the response information of the printer 11 is transferred in correspondence with the command information from the personal computer. However, in such a case wherein an occurrence of error such as no recording sheet or ink is notified or wherein a completion of a print process for all transferred print data information is notified, it is convenient if the printer 11 can transfer response information to the personal computer 11 even if corresponding command information is not present. As described with FIG. 4, since the response information contains a type code, the personal computer 10 can judge the type of response information although it does not transfer command information. Furthermore, since the response information cannot be transferred until the communication mode transitions to the nibble mode, it is desirable that the printer 11 can issue the reverse direction transfer request to the personal computer 10.

Figure 8:
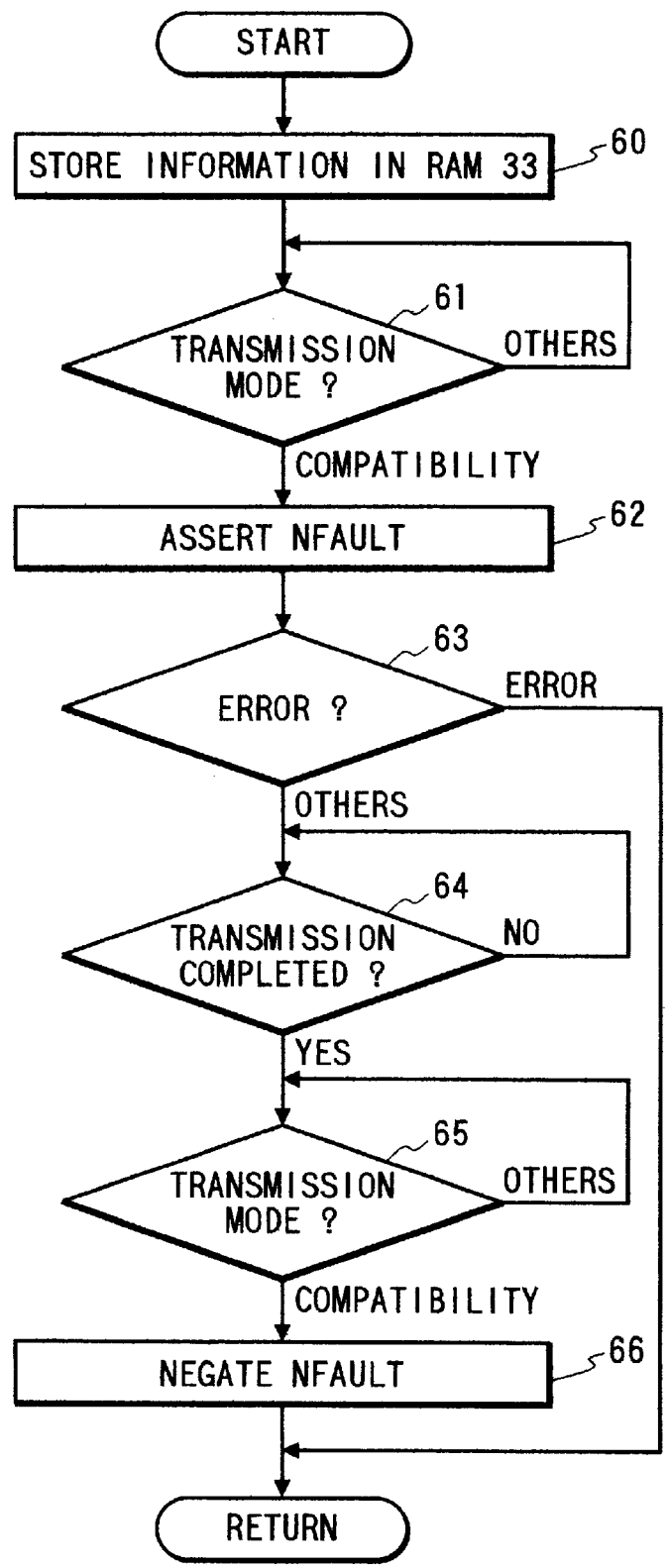
FIG. 8 is a flowchart illustrating an operation of the information transfer system.
Figure 9:
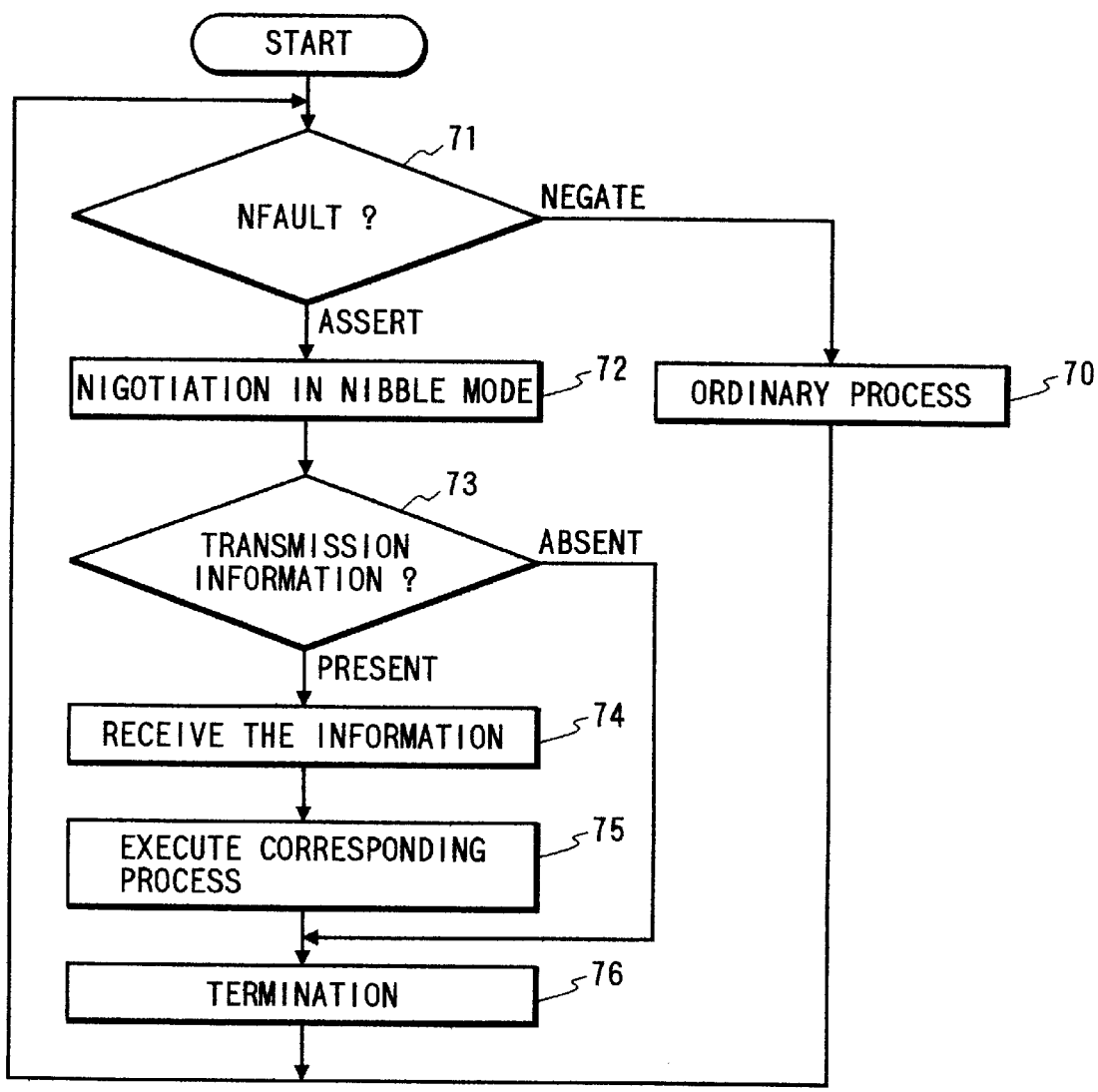
FIG. 9 is a flowchart illustrating an operation of the information transfer system.

With reference to FIGS. 8 and 9, the operation sequences of the printer 11 and personal computer 10 will be described wherein the printer 11 issues the reverse direction information transfer request to the personal computer 10. FIG. 8 is a flowchart illustrating the operation of the printer 11. When an event to be notified to the personal computer 10 occurs at the printer 11, transfer transmission information corresponding to response information is stored at Step 60 in RAM 33 even if there is no command information. It is checked at Step 61 whether the communication mode of the parallel I/F 12 is the compatibility mode. If not, the flow stands by until the transition to the compatibility mode is made. Next, at Step 62, the nFault signal is asserted, i.e., made low, and it is judged at Step 63 whether the event occurred at Step 63 is a notice of an error or not. If an error notice, the specific operation is not performed but the normal process resumes (the nFault signal is negated when the error is corrected during the normal process). If not the error notice at Step 63 (e.g., if the event is a notice of a print process completion), the flow advances to Step 64 and stands by until the transmission information stored in RAM 33 at Step 60 is completely transferred. This transmission information is transferred to the personal computer 10 by the processes at Steps 54 and 55 shown in FIG. 7, when the communication mode transitions to the nibble mode. After the transfer completion, the flow stands by at Step 65 until the communication mode transitions to the compatibility mode, and the nFault signal is negated, i.e., made high at Step 66. After Step 66, the normal process resumes.

FIG. 9 is a flowchart illustrating the operation of the personal computer 10. While the personal computer 10 performs the ordinary process at Step 70, it periodically polls the state of the nFault signal at Step 71. If the nFault signal is being asserted, the flow advances to Step 72 to perform negotiation in the nibble mode. It is confirmed at Step 73 whether there is any transmission information transferred from the printer 11 to the personal computer 10. Presence of the transmission information can be confirmed by the state of the nDataAvail signal. If there is transmission information, this information is received at Step 74 and a process corresponding to the received transmission information is executed. The termination process is executed at Step 76 to return to Step 70. If there is no transmission information at Step 73, the termination process is immediately performed at Step 75 to return to Step 70.

In the information transfer system of this embodiment, the nFault signal is used for both a notice of error and for the reverse direction information transfer request. If an error occurs and the nFault signal is asserted, the negotiation in the nibble mode is continuously executed at Step 71 until the error is corrected. However, since a presence/absence of the transmission information is confirmed at Step 72, the same transmission information will not be transferred in duplicate. In the above embodiments, the nFault signal is shared by reverse direction information transfer request signal. The invention is not limited thereto, but other control signals such as a PError signal and a Select signal or a combination thereof may also be used.

At Step 72, after the command information is transferred during negotiation in the command transfer mode described with the first embodiment, the negotiation may be performed in the nibble mode. In this case, the printer 11 transfers both the transmission information and the response information of the command information (however, if the transmission information and response information are the same, one of them can be omitted).

As described so far, in the above embodiments, the reverse direction information transfer request can be issued from a peripheral to a host in the nibble mode, like the ECP mode. Furthermore, information can be transferred from a peripheral to a host by using the nFault signal which has conventionally been used for transferring an error state of the peripheral to the host, the upper hierarchical programs of the peripheral and host can be designed without considering the ECP mode, nibble mode, byte mode, and the like. In the description of the above embodiments (first and second embodiments), the reverse direction information transfer request is performed in the nibble mode. Instead of the nibble mode, the byte mode may be used in quite the same manner as above. Although a printer is used illustratively for a peripheral, the invention is not limited only thereto, but it is applicable to other systems having other peripherals such as scanners and external storages.

As described above, in the information transfer method and the first information transfer system of the invention, even if the nibble or byte mode is incorporated as bi-directional parallel I/F, the command information and data information can be discriminately transferred from a host to a peripheral. Furthermore, in the second information transfer system of the invention, even if the nibble or byte mode is incorporated as bi-directional parallel I/F, the reverse direction information transfer request can be issued from a peripheral to a host.

Specifically, according to the invention, even if conventional hosts are used such as so-called PC compatible machines whose parallel I/F cannot deal with the ECP mode, bi-directional parallel I/F with a higher grade function can be realized.

What is claimed is:

1. A host apparatus comprising:
   interface means for transmitting data to a peripheral in a first communication mode and for receiving response information from the peripheral in a second communication mode;
   first control means for, when switching said interface means between the first and second communication modes, controlling said interface means to change to a negotiation phase and transmit a first extensibility request value to the peripheral; and second control means for, when transmitting to the peripheral a command to be processed distinguishably from the data to be transmitted by said interface means, controlling said interface means to change to a negotiation phase and transmit a second extensibility request value and the command to the peripheral.

2. An apparatus according to claim 1, wherein the command comprises a command for one of switching between on-line and off-line modes, confirming an operation status of the peripheral, confirming a function of the peripheral, a confirming a presence or absence of an error, confirming contents of an error, and correcting an error.

3. An apparatus according to claim 1, wherein said interface means comprises a parallel interface defined by IEEE P1284, and the first communication mode is a compatibility mode and the second communication mode is one of a nibble mode and a byte mode.

4. An apparatus according to claim 1, wherein the peripheral comprises a printer.

5. An apparatus according to claim 1, wherein when switching the communication mode, said first control means controls said interface means to change from the first communication mode to the negotiation phase and transmit the first extensibility request value to the peripheral, to change to the second communication mode and receive the response information from the peripheral, and to change to a termination phase and then to the first communication mode, and wherein when transmitting the command to the peripheral, said second control means controls said interface means to change from the first communication mode to the negotiation phase and transmit the second extensibility request value and the command to the peripheral, and to change to a termination phase and then to the first communication mode.

6. A peripheral comprising:
interface means for receiving data from a host apparatus in a first communication mode and for transmitting response information to the host apparatus in a second communication mode;
first control means for controlling said interface means to transmit the response information to the host apparatus when said interface means receives a first extensibility request value in a negotiation phase of said interface means; and
second control means for controlling a memory to store a command received from the host apparatus in a first memory area different from a second memory area for storing the data received from the host apparatus when said interface means receives a second extensibility request value in the negotiation phase of said interface means.

7. A peripheral according to claim 6, wherein the command comprises a command for one of switching between on-line and off-line modes, confirming an operation status of said peripheral, confirming a function of said peripheral, confirming a presence or absence of an error, confirming contents of an error, and correcting an error.

8. A peripheral according to claim 6, wherein said interface means comprises a parallel interface defined by IEEE P1284, and the first communication mode is a compatibility mode and the second communication mode is one of a nibble mode and a byte mode.

9. A peripheral according to claim 6, further comprising print means for printing the data stored in the second memory area.

10. A peripheral according to claim 6, wherein said first control means controls said interface means to transmit the response information to the host apparatus and change to a termination phase, when said interface means receives the first extensibility request value in the negotiation phase of said interface means, and wherein said second control means controls the memory to store the received command in the first memory area, prepares response information if the received command requires the response information, and controls said interface means to change to a termination phase, when said interface means receives the second extensibility request value in the negotiation phase of said interface means.

11. A communication system comprising:
a host apparatus;
a peripheral apparatus; and
interface means operable in a first communication mode in which said host apparatus transmits data to said peripheral and in a second communication mode in which said host apparatus receives response information from said peripheral,
wherein said host apparatus comprises:
first control means for, when switching said interface means between the first and second communication modes, controlling said interface means to change to a negotiation phase and transmit a first extensibility request value to said peripheral; and
second control means for, when transmitting to said peripheral a command to be processed distinguishably from the data to be transmitted by said interface means, controlling said interface means to change to a negotiation phase and transmit a second extensibility request value and the command to said peripheral, and
wherein said peripheral comprises:
third control means for controlling said interface means to transmit the response information to said host apparatus when said interface means receives the first extensibility request value in the negotiation phase of said interface means; and
fourth control means for controlling a memory to store the command received from said host apparatus in a first memory area different from a second memory area for storing the data received from said host apparatus when said interface means receives the second extensibility request value in the negotiation phase of said interface means.

12. A system according to claim 11, wherein the command comprises a command for one of switching between on-line and off-line modes, confirming an operation status of said peripheral, confirming a function of said peripheral, confirming a presence or absence of an error, confirming contents of an error, and correcting an error.

13. A system according to claim 11, wherein said interface means comprises a parallel interface defined by IEEE P1284, and the first communication mode is a compatibility mode and the second communication mode is one of a nibble mode and a byte mode.

14. A system according to claim 11, wherein said peripheral comprises a printer.

15. A system according to claim 11, wherein when switching the communication mode, said first control means controls said interface means to change from the first communication mode to the negotiation phase and transmit the first extensibility request value to said peripheral, to change to the second communication mode and receive the response information from said peripheral, and to change to a termination phase and then to the first communication mode, wherein when transmitting the command to said peripheral, said second control means controls said interface means to change from the first communication mode to the negotiation phase and transmit the second extensibility request value and the command to said peripheral, and to change to a termination phase and then to the first communication mode, wherein said third control means controls said interface means to transmit the response information to said host apparatus and change to a termination phase, when said interface means receives the first extensibility request value in the negotiation phase of said interface means, and wherein said fourth control means controls the memory to store the received command in the first memory area, prepares response information if the received command requires the response information, and controls said interface means to change to a termination phase, when said interface means receives the second extensibility request value in the negotiation phase of said interface means.

16. A method carried out in a host apparatus having an interface for transmitting data to a peripheral in a first communication mode and for receiving response information from the peripheral in a second communication mode, said method comprising the steps of:
when switching the interface between the first and second communication modes, controlling the interface to change to a negotiation phase and transmit a first extensibility request value to the peripheral; and
when transmitting to the peripheral a command to be processed distinguishably from the data to be transmitted by the interface, controlling the interface to change to a negotiation phase and transmit a second extensibility request value and the command to the peripheral.

17. A method according to claim 16, wherein the command comprises a command for one of switching between on-line and off-line modes, confirming an operation status of the peripheral, confirming a function of the peripheral, a confirming a presence or absence of an error, confirming contents of an error, and correcting an error.

18. A method according to claim 16, wherein the interface comprises a parallel interface defined by IEEE P1284, and the first communication mode is a compatibility mode and the second communication mode is one of a nibble mode and a byte mode.

19. A method according to claim 16, wherein the peripheral comprises a printer.

20. A method according to claim 16, wherein when switching the communication mode, said first control step controls the interface to change from the first communication mode to the negotiation phase and transmit the first extensibility request value to the peripheral, to change to the second communication mode and receive the response information from the peripheral, and to change to a termination phase and then to the first communication mode, and wherein when transmitting the command to the peripheral, said second control step controls the interface to change from the first communication mode to the negotiation phase and transmit the second extensibility request value and the command to the peripheral, and to change to a termination phase and then to the first communication mode.

21. A method carried out in a peripheral having an interface for receiving data from a host apparatus in a first communication mode and for transmitting response information to the host apparatus in a second communication mode, said method comprising the steps of:
controlling the interface to transmit the response information to the host apparatus when the interface receives a first extensibility request value in a negotiation phase of said interface means; and
controlling a memory to store a command received from the host apparatus in a first memory area different from a second memory area for storing the data received from the host apparatus when the interface receives a second extensibility request value in the negotiation phase of the interface.

22. A method according to claim 21, wherein the command comprises a command for one of switching between on-line and off-line modes, confirming an operation status of the peripheral, confirming a function of the peripheral, confirming a presence or absence of an error, confirming contents of an error, and correcting an error.

23. A method according to claim 21, wherein the interface comprises a parallel interface defined by IEEE P1284, and the first communication mode is a compatibility mode and the second communication mode is one of a nibble mode and a byte mode.

24. A method according to claim 21, further comprising the step of printing the data stored in the second memory area.

25. A method according to claim 21, wherein said first control step controls the interface to transmit the response information to the host apparatus and change to a termination phase, when the interface receives the first extensibility request value in the negotiation phase of the interface, and wherein said second control step controls the memory to store the received command in the first memory area, prepares response information if the received command requires the response information, and controls the interface to change to a termination phase, when said interface means receives the second extensibility request value in the negotiation phase of the interface.

26. A method carried out in a communication system having a host apparatus, a peripheral apparatus and an interface operable in a first communication mode in which the host apparatus transmits data to the peripheral and in a second communication mode in which the host apparatus receives response information from the peripheral, said method comprising:
in the host apparatus:
a first control step of, when switching the interface between the first and second communication modes, controlling the interface to change to a negotiation phase and transmit a first extensibility request value to the peripheral; and
a second control step of, when transmitting to said peripheral a command to be processed distinguishably from the data to be transmitted by the interface, controlling the interface to change to a negotiation phase and transmit a second extensibility request value and the command to the peripheral, and
in the peripheral:
a third control step of controlling the interface to transmit the response information to the host apparatus when the interface receives the first extensibility request value in the negotiation phase of the interface; and
a fourth control step of controlling a memory to store the command received from the host apparatus in a first memory area different from a second memory area for storing the data received from the host apparatus when the interface receives the second extensibility request value in the negotiation phase of the interface means.

27. A method according to claim 26, wherein the command comprises a command for one of switching between on-line and off-line modes, confirming an operation status of the peripheral, confirming a function of the peripheral, confirming a presence or absence of an error, confirming contents of an error, and correcting an error.

28. A method according to claim 26, wherein the interface comprises a parallel interface defined by IEEE P1284, and the first communication mode is a compatibility mode and the second communication mode is one of a nibble mode and a byte mode.

29. A method according to claim 26, wherein the peripheral comprises a printer.

30. A method according to claim 26, wherein when switching the communication mode, said first control step controls the interface step to change from the first communication mode to the negotiation phase and transmit the first extensibility request value to the peripheral, to change to the second communication mode and receive the response information from the peripheral, and to change to a termination phase and then to the first communication mode, wherein when transmitting the command to the peripheral, said second control step controls the interface to change from the first communication mode to the negotiation phase and transmit the second extensibility request value and the command to the peripheral, and to change to a termination phase and then to the first communication mode, wherein said third control step controls the interface to transmit the response information to the host apparatus and change to a termination phase, when the interface receives the first extensibility request value in the negotiation phase of the interface, and wherein said fourth control step controls the memory to store the received command in the first memory area, prepares response information if the received command requires the response information, and controls the interface to change to a termination phase, when the interface receives the second extensibility request value in the negotiation phase of the interface.

* * * * *

UNITED STATES PATENT AND TRADEMARK OFFICE
CERTIFICATE OF CORRECTION

PATENT NO. : 5,926,650
DATED : July 20, 1999
INVENTOR(S) : Noriyuki Suzuki et al.

Page 1 of 1

It is certified that error appears in the above-identified patent and that said Letters Patent is hereby corrected as shown below:

Title page,
Item [56], References Cited,
FOREIGN PATENT DOCUMENTS, "055150914" should read -- 5-150914 --.

Sheet 7,
Figure 9, "NIGOTIATION" should read -- NEGOTIATION --.

Column 2,
Line 34, "roll" should read -- role --.

Column 5,
Line 39, "31, 33," should read -- 31, 32, 33, --.

Column 6,
Line 11, "(nselect1n" should read -- (nSelectIn --.

Column 9,
Line 9, "a" (second occurrence) should be deleted.

Column 11,
Line 34, "a" (second occurrence) should be deleted.

Signed and Sealed this

Fifth Day of March, 2002

Attest:

*Attesting Officer*

JAMES E. ROGAN
*Director of the United States Patent and Trademark Office*